United States Patent [19]
Dixon

[11] Patent Number: 4,867,625
[45] Date of Patent: Sep. 19, 1989

[54] VARIABLE CLAMP FASTENER AND METHOD

[75] Inventor: Richard D. Dixon, San Juan Capistrano, Calif.

[73] Assignee: Huck Manufacturing Company, Irvine, Calif.

[21] Appl. No.: 282,875

[22] Filed: Dec. 9, 1988

Related U.S. Application Data

[63] Continuation of Ser. No. 728,055, Apr. 29, 1985, abandoned, which is a continuation-in-part of Ser. No. 664,209, Oct. 24, 1984, abandoned, and a continuation of Ser. No. 45,186, Apr. 22, 1987, abandoned, and a continuation of Ser. No. 185,327, Apr. 20, 1988.

[51] Int. Cl.$^4$ .............................................. F16B 19/08
[52] U.S. Cl. .................................... 411/361; 411/411; 411/436; 29/437; 29/452; 29/517; 29/520
[58] Field of Search ............... 411/361, 360, 310, 311, 411/308, 1, 411, 354, 436, 2, 39, 501, 453, 447, 500, 337, 260, 277, 285, 937.2; 29/243.53, 243.52, 452, 437, 517, 520

[56] References Cited

U.S. PATENT DOCUMENTS

| | | |
|---|---|---|
| 612,316 | 10/1898 | Downes . |
| 1,229,560 | 6/1917 | Whiteman . |
| 2,397,076 | 3/1946 | Keller et al. ............... 411/361 X |
| 2,510,076 | 6/1950 | Cockrell . |
| 2,531,048 | 11/1950 | Huck . |
| 2,531,049 | 11/1950 | Huck . |
| 2,669,469 | 2/1954 | Finch . |
| 2,764,046 | 9/1956 | Koenig ...................... 411/361 X |
| 2,894,425 | 7/1959 | Rapata . |
| 2,955,505 | 10/1960 | Schuster . |
| 2,972,274 | 2/1961 | La Bombard et al. . |
| 3,078,002 | 2/1963 | Rodgers, Jr. . |
| 3,094,017 | 6/1963 | Campoux et al. . |
| 3,136,204 | 6/1964 | Reynolds ......................... 411/70 |
| 3,139,786 | 7/1964 | Ardell ............................ 411/361 |
| 3,203,300 | 8/1965 | Marschner . |
| 3,241,421 | 3/1966 | Siebol . |

(List continued on next page.)

FOREIGN PATENT DOCUMENTS

| | | |
|---|---|---|
| 157520 | 7/1954 | Australia. |
| 2151847 | 4/1972 | Fed. Rep. of Germany . |
| 2613499 | 10/1977 | Fed. Rep. of Germany . |
| 2744666 | 4/1979 | Fed. Rep. of Germany . |
| 3022414 | 1/1982 | Fed. Rep. of Germany . |
| 3031048 | 3/1982 | Fed. Rep. of Germany . |
| 1546527 | 10/1968 | France ............................ 411/411 |
| 2167419 | 7/1973 | France . |
| 22402 | 12/1961 | German Democratic Rep. . |
| 358991 | 1/1962 | Switzerland . |
| 483571 | 2/1970 | Switzerland . |
| 232671 | 4/1969 | U.S.S.R. . |
| 566907 | 1/1945 | United Kingdom . |
| 1023780 | 3/1966 | United Kingdom . |
| 2028949 | 3/1980 | United Kingdom . |
| 2083586 | 3/1982 | United Kingdom . |

Primary Examiner—Rodney M. Lindsey
Attorney, Agent, or Firm—Harness, Dickey & Pierce

[57] ABSTRACT

A fastening system including a two piece swage type fastener including a pin and a collar adapted to be swaged into lock grooves in the pin and in which the lock grooves are helical and with the collar having a limited female thread which is threadably engageable with the helical lock grooves for variably clamping work pieces to be secured prior to swage, with the collar thread being deformable in response to a relative axial load between the pin and collar at the initiation of the swage operation but prior to swaging and in which the lock grooves are shallow and have a ratio of $(h/Du) \times 10^2$ of four (4) or less and in which the lock grooves have a simulated streamlined root contour, with the collar having a wall thickness defining a volume of material sufficient to provide overpacking of the shallow grooves of around 16%, and with the pin and collar materials having ultimate shear strengths in a ratio of around 1.8:1 to 2.4:1 and with the width of the shallow grooves and intervening shoulders being generally in accordance with the shear strength ratio between the pin and collar.

15 Claims, 4 Drawing Sheets

U.S. PATENT DOCUMENTS

| | | | |
|---|---|---|---|
| 3,295,404 | 1/1967 | Baker | 411/361 |
| 3,367,228 | 2/1968 | King | 411/361 |
| 3,371,572 | 3/1968 | King, Jr. | |
| 3,394,626 | 7/1968 | Oliver | 411/411 |
| 3,412,639 | 11/1968 | Sauter | 411/43 |
| 3,421,562 | 1/1969 | Orloff et al. | 411/336 |
| 3,425,259 | 2/1969 | Baugh | |
| 3,464,472 | 2/1969 | Reynolds | 411/361 X |
| 3,512,448 | 5/1970 | Summerlin et al. | |
| 3,560,124 | 2/1971 | Bergere | |
| 3,779,127 | 12/1978 | Speakman | |
| 3,796,125 | 3/1974 | Campbell et al. | 411/2 |
| 3,915,052 | 10/1975 | Ruhl | |
| 3,915,053 | 10/1975 | Ruhl | 411/361 |
| 3,988,959 | 11/1976 | Buchanan | |
| 3,999,339 | 12/1976 | Sappenfield | |
| 4,012,828 | 3/1977 | Dahl | 411/260 X |
| 4,028,988 | 6/1977 | Schafers | |
| 4,050,346 | 9/1977 | Fischer | |
| 4,069,575 | 1/1978 | Sigmund | 411/361 X |
| 4,084,829 | 4/1978 | Falchle et al. | 411/411 X |
| 4,136,596 | 1/1979 | Davis, Jr. | 411/360 |
| 4,137,816 | 2/1979 | Gartner | |
| 4,197,782 | 4/1980 | Champoux | |
| 4,198,895 | 4/1980 | Ruhl | 411/354 |
| 4,254,809 | 3/1981 | Schuster | 411/260 X |
| 4,260,005 | 4/1981 | Stencel | 411/3 |
| 4,309,138 | 1/1982 | Jarman et al. | |
| 4,314,784 | 2/1982 | Tausig | 411/361 X |
| 4,324,518 | 4/1982 | Dixon | |
| 4,339,217 | 7/1982 | Lacey | |
| 4,342,529 | 8/1982 | Smith | |
| 4,408,936 | 10/1983 | Williamson | 411/3 |
| 4,435,111 | 3/1984 | Mizusawa | |
| 4,437,805 | 3/1984 | Smith | |
| 4,472,096 | 9/1984 | Ruhl et al. | |
| 4,519,735 | 5/1985 | Machtle | |

VARIABLE CLAMP FASTENER AND METHOD

REFERENCE TO RELATED APPLICATION

The present invention is a continuation of U.S. patent application Ser. No. 728,055, filed Apr. 29, 1985, now abandoned, which is a continuation-in-part of U.S. patent application No. 664,209 by Richard D. Dixon for High Strength Fastener and Method files Oct. 24, 1984 now abandoned and continued as Ser. No. 045,186 filed Apr. 22, 1987 itself now abandoned and continued as Ser. No. 185,327 filed Apr. 20, 1988 and the subject matter of that application is incorporated herein by reference.

SUMMARY BACKGROUND OF THE INVENTION

The present invention relates to two-piece fasteners and more particularly to swage type fasteners having a variable clamp capability and to a method for securing workpieces.

The present invention generally relates to two-piece swage type fasteners or lockbolts of the type illustrated in U.S. Pat. No. 3,915,053 to J. Ruhl, issued Oct. 28, 1975, U.S. Pat. No. 2,531,048 to L. Huck, issued Nov. 21, 1950 and to U.S. Pat. No. 4,472,096 to J. Ruhl and R. Dixon, issued on Sept. 18, 1984. All of the above patents can be considered as prior art relative to the present invention.

The fastener of the present invention, as with the prior art noted, includes a pin and a collar adapted to be swaged into lock grooves in the pin in response to a preselected relative axial force applied between the pin and collar.

In many commercial applications, two-piece threaded fasteners are used and are installed in two or more steps. Thus it is common to secure a structure first by attaching the associated members with the fasteners loosely engaged. This facilitates adjustment and/or alignment of the structural members to a final, desired orientation. Next the fasteners are tightened to a preselected final torque. A traditional problem with torque applied threaded fasteners is that the clamp force attained is generally unpredictable due to frictional and other factors i.e. friction between nut and engaged workpiece surface, friction in the engaging threads, etc. Two-piece swage type fasteners, however, are not confronted with such frictional problems and hence can provide more uniformly predictable clamp loads. However, the swage type fasteners have not been capable of providing the initial variable clamp up available with threaded fasteners and still provide a full clamp with only a second, final installation step. Prior threaded swage and/or crimp type fasteners would require extra steps or complex tooling. For example, a threaded crimp type fasteners would not provide the same flexibility without complex installation tools; see for example the U.S. Pat. No. 3,421,562 to J. F. Orloff et al issued Jan. 14, 1969. While the latter fastener would permit an initial variable clamp load similar to a conventional threaded fastener, the final installation would require either two additional steps of final torquing and crimping or a complex tool capable of performing the latter steps in sequence.

In the present invention the lock grooves of the pin are in the form of a helical male thread. The collar is provided with a mating, female thread of a preselected extent such that the initial clamp can be accommodated. However, the female collar thread is selected to be of a limited circumferential extent and shear strength such that the collar can be brought to its final, desired clamp position and swaged to the pin via a conventional installation tool. Thus for the final installation, a conventional pull tool can be used to apply a relative axial force between the pin and the collar. The female collar thread is selected such that, in response to the relative axial force and at a level prior to the initiation of collar deformation or swaging into the lock grooves of the pin, it will shear or deform such that the collar will be free to move axially over the pin and to respond to the installation loads in the same manner as a collar without such limited female thread form. Now the workpieces can be finally clamped together with the same effectiveness as swage type fasteners.

In some applications it is desirable that the fasteners have a high strength, high performance characteristic both in clamp up and in fatigue. In this latter regard then, it is advantageous to utilize the concepts of the invention of the parent C.I.P. application to Dixon (supra).

Thus, in a preferred form of the present invention, the fastener comprises a pin and a collar adapted to be swaged into lock grooves in the pin. The lock grooves in the pin, unlike the lock grooves of the prior art noted, are very shallow and are constructed to have roots of a simulated streamlined shape. As noted the lock grooves are helical and define a desired thread configuration. The shallow grooves and simulated streamlined shape, however, provide a resultant fatigue life which is superior to that of a comparable threaded fastener. At the same time the collar is provided with a predetermined wall thickness, and hence volume, not only to provide an over fill condition of the lock grooves during swaging but also to provide a retained clamp having a magnitude which is a high percentage of the installation load and of the yield strength of the pin in tension across the lock grooves. Thus the collar wall thickness is selected to enhance retained clamp and to provide sufficient hoop stiffness to inhibit spring back of the collar material out of the shallow lock grooves in the pin. The subject fastener will also provide clamp loads which are significantly higher than those achievable with a threaded, solely torqued counterpart because of the absence of the applied torque (and resultant friction) required for the threaded system.

In the present invention, the design failure load can provide a failure in shear across either the shoulders of the pin lock grooves or the shoulders defined by the swaged collar. In other words, a relatively high strength pin is used which will not fail across the engaged grooves at the lower magnitudes of applied tensile loads. Thus, with a given pin, the magnitude of available design tensile load can be increased or decreased simply by varying the length of the collar and hence by varying the number of pin and collar shoulders that are supported the tensile load. This selective variation can occur until the appropriate number of engaged shoulders are provided whereby failure under tensile loading will occur as a tensile failure diametrically across the pin.

In one form of the present invention, the resultant preload applied to the pin is slightly below that load at which yielding would occur in the pin lock grooves. The collar is slightly longer than that required to provide engagement of the appropriate number of pin and collar shoulders to hold that preload; in this case the failure at the design tensile load will be in shear across the collar and/or pin shoulders. By simply increasing the length of the collar the number of engaged shoulders will be increased whereby failure will occur at a higher tensile load in tension diametrically across the pin lock grooves. In either event, the result will be a retained preload of a high magnitude on the fastened joint.

Note that when the high preload levels are considered in conjunction with the advantages of the helical lock grooves which are considerably shallower than the threads or grooves in a comparable conventional, threaded system, the attainable improvement in fatigue and retained stress is even more significant. Some additional gains are secured over an annular groove of a shallow structure with the tensile strength and fatigue life of the pin being somewhat greater since the helical shape will provide a greater diametrical lock groove dimension than the shallow annular groove. Conversely, however, equivalent values could be secured between the helical and annular shallow groove constructions by a slight reduction in the effective cross-sectional area of the threaded construction.

Thus the fastener of the present invention will not only provide significantly improved fatigue characteristics but will also provide a very high clamp load. In one form of the invention the fastener can provide a tensile load carrying capacity up to the tensile strength of the pin across the helical lock grooves which, because of the shallow grooved structure, will be of a maximized magnitude relative to the pin diameter.

At the same time, however, the unique collar and pin combination will permit the desired variable clamp load such that the structural components can be pre-assembled under one load and quickly and efficiently fastened together under high, final clamp loads in a second fastening operation. The latter can be accomplished with a conventional pull tool It should be noted that the pin can be of a high strength such that there will be no significant yielding in response to the final swage load. The utilization of the desirable shallow groove construction is a significant factor in resisting such yielding. The latter feature is desirable in the present invention where the pin has a helical thread form. Now when the collar is finally swaged into the helical pin grooves, a complementary female thread will be formed in the collar. If the helical thread form of the pin lock grooves are distorted during collar swage, then they will not subsequently function effectively as a threaded fastener with the swaged collar. With the shallow grooved, high strength pin of one form of the present invention such distortion is inhibited. Now the integrity of the thread form is maintained and the swaged collar can be removed by a suitable wrenching tool.

While in one form of the invention the final installation of the fastener can be accomplished with a conventional pull tool, in another form a stump type version of the fastener could be utilized with the final installation effectuated by a squeeze type tool.

Thus it is an object of the present invention to provide a novel two-piece swage type fastener for a fastened joint with a pin having a lock grove section with a helical thread form and with a collar adapted to be swaged into the lock groove section and having a preselected complementary threaded portion allowing a threaded connection whereby a variable clamp can be initially applied to the fastened joint prior to swage.

It is another object of the present invention to provide a novel two-piece swage type fastener of the type noted in the preceding object in which the collar thread is adapted to be sheared or deformed at a preselected load prior to swage but in response to the load applied to the pin and collar to effectuate the initiation of final swaging It is another object to provide a novel two-piece swage type fastener having a variable clamp characteristic and including a pin having relatively shallow helical lock grooves of a simulated streamlined root configuration whereby fatigue life of the installed fastener is improved.

It is another object of the present invention to provide the two-piece swage type fastener having a variable clamp characteristic and including a pin with shallow grooves of the above described type whereby the final clamp load of the fastened joint can be maximized relative to the installation load and the tensile yield strength of the pin.

It is still another object of the present invention to provide a novel two-piece swage type fastener having a collar including a thread form for facilitating an initial variable clamp and having a preselected wall thickness for providing a magnitude of final retained clamp load which is a high percentage of the installation load applied to the fastened joint.

It is another general object of the present invention to provide a novel two-piece swage type fastener.

Other objects, features and advantages of the present invention will become apparent from the subsequent description and the appended claims, taken in conjunction with the accompanying drawings, in which:

Figure 1:
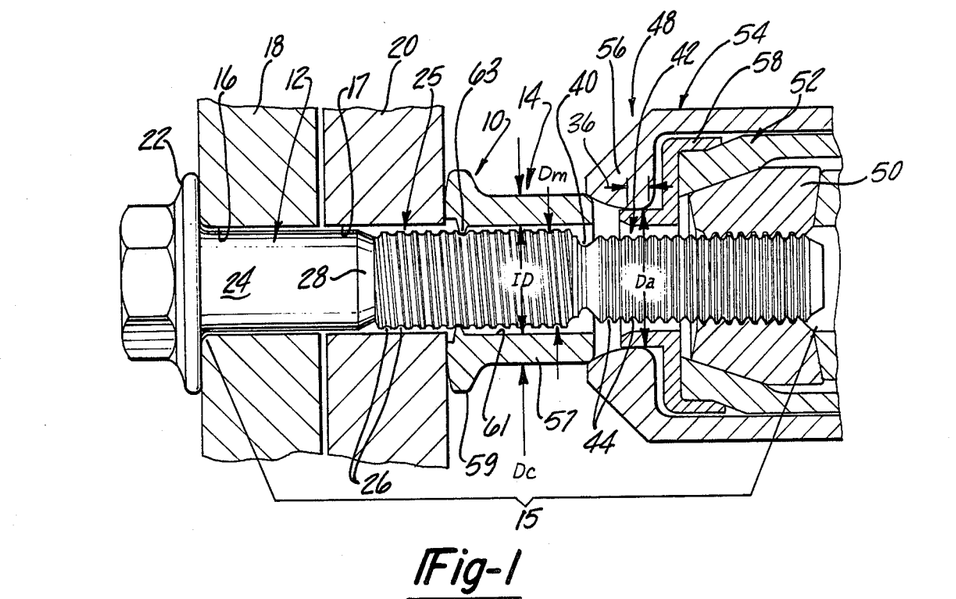
FIG. 1 is a longitudinal view with some portions shown in section and others shown broken away of a fastener of the present invention in assembly relationship with workpieces and with a portion of a tool shown as applied to the fastener prior to final installation.
Figure 2:
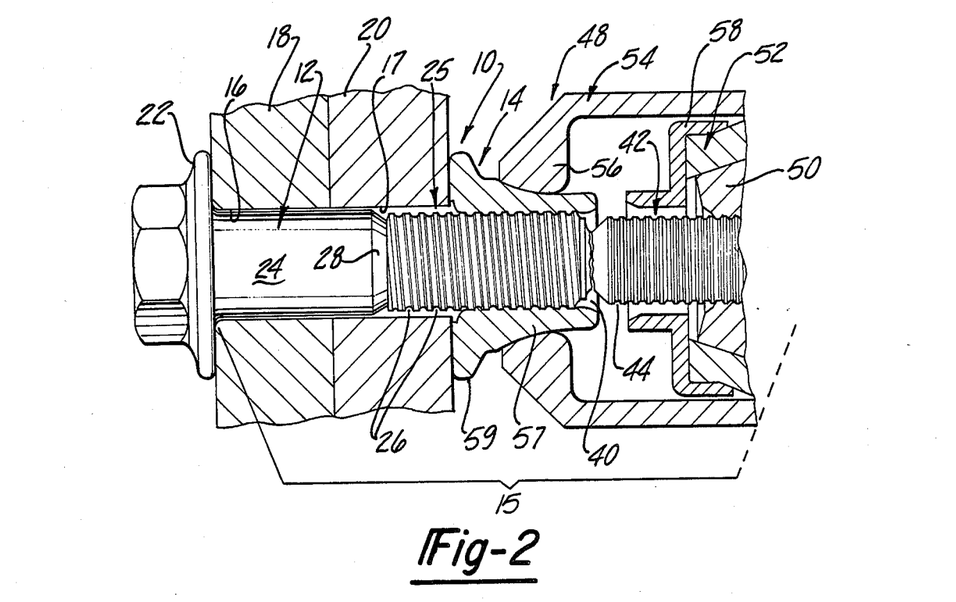
FIG. 2 is a view similar to that of FIG. 1 showing the fastener after it has been set.

Looking now to FIGS. 1 and 2, a fastener 10 is shown to include a pin member 12 and tubular collar 14. Pin member 12 has an elongated shank 15 which extends through aligned openings 16 and 17 in a pair of workpieces 18 and 20, respectively, to be secured together.

An enlarged protruding head 22 at one end of shank 15 engages one side of workpiece 18. Adjacent the head 22, the shank 15 has a straight portion 24 which is adapted to be received within aligned bores 16 and 17 with a clearance fit. Following the straight portion 24 is a lock groove portion 25 defined by a plurality of grooves 26 having a continuous, helical thread form. A transition portion 28 smoothly connects the locking grooves 26 with straight shank portion 24.

A breakneck groove 40 is located between the lock groove portion 25 and a gripping or pull portion 42 and defines the weakest portion on the shank 15. The pull portion 42 is comprised of a plurality of annular pull grooves 44 which are of a reduced diameter relative to the shank portion 24 and the lock groove portion 25. The pull grooves 44 are adapted to be gripped by a tool 48 which is actuable to set the fastener 10. The tool 48 can be generally constructed in a manner known to those skilled in the art and hence is only partially shown for purposes of simplicity. Briefly, the tool 48 has a plurality of jaws 50 adapted to grip the pin 12 at pull grooves 44. Jaws 50 are located in a tubular collet assembly 52 which is slidably supported in an anvil housing 54 which terminates at one end in a swage anvil portion 56.

Figure 6:
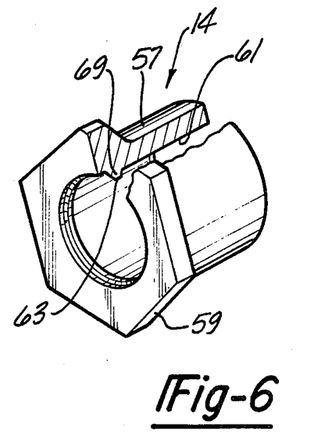
FIG. 6 is a partially broken, pictorial view of the collar of FIGS. 1 and 2.

The tubular collar 14 has a generally straight shank portion 57 terminating in an enlarged flange 59. Both the pin head 22 and collar flange 59 are provided with wrenching flats to facilitate gripping by a wrench or other suitable tool for applying a relative torque between the pin member 12 and collar 14 (see FIGS. 1, 2 and 6). With regard to the latter, the collar 14 has a generally smooth bore 61 of a diameter ID to be in clearance with the pin shank 15; a female thread 63 is formed at the flange end of the bore 61 and is adapted to complementarily, threadably engage the helical lock grooves 26. For a reason to be seen the collar thread 63 is limited and in one form is defined by around a single, 360° thread. The collar 14 is conventionally cold formed and thus the collar thread 63 can be coined or otherwise formed in the collar 14 during such cold forming. As shown in FIG. 6, the collar thread 63 is formed in a generally radially inwardly extending shoulder 69 which is defined in part at the flange end of the collar 14 by a counterbore. The width of the thread 63 or shoulder (or shoulder portion) 69 is substantially the same as the width of the groove or thread 26.

In operation, then, the workpieces 18 and 20 can be first joined together by the threaded engagement between the limited collar thread 63 and the threaded lock grooves 26. The pull portion 42 has a maximum diameter less than the inside diameter of the collar thread 63 so that the collar 14 can be moved onto the pin 12 and collar thread 63 readily applied to the lock groove portion 25. The wrenching surfaces on the pin head 22 and collar flange 59 facilitate torquing to a desired magnitude or extent of clamp. As noted, in some applications, it is advantageous to have the workpieces 18 and 20 lightly clamped or even loosely held together to permit an appropriate fit up of the associated structure prior to final installation. After this has been accomplished the installation tool 48 is applied to the fastener 10 and a relative axial force is applied between the pin 12 and collar 14 via the jaw assembly 50 gripping the pull groove portion 42 and the swage anvil 56 engaging the outer end of the collar 14. As the relative axial force increases, the limited collar thread 63 will shear or deform sufficiently to permit the collar 14 to move further axially relative to the pin 12. In this condition, the pin 12 and collar 14 will now act as a swage type fastener; the workpieces 18 and 20 are clamped together at a preselected preload by the relative axial force initially applied between the pin 12 and collar 14 and, as the axial force increases, the collar 14 is swaged into the helical lock groove portion 25. As the axial force continues to increase, a magnitude will be attained at which the pin 12 will fracture at the breakneck groove 40 completing the swaging operation (see FIG. 2). Subsequently, upon further actuation of the tool 48, a collar ejector member 58 will be urged forwardly to eject the swaged collar 14 from the anvil 56 thus completing the installation. Thus the collar 14 will be swaged into the lock groove portion 25 at a relative axial force of a first preselected magnitude which is greater than the second preselected magnitude of relative axial force at which the limited collar thread 63 is sheared or deformed.

Note that the contour of the swage cavity of the anvil 56 and the contour of the outer end of the collar 14 are such that swaging of the collar 14 into the lock grooves 26 will not start to occur at the lower magnitude of relative axial force required to shear or deform the limited collar thread 63 at the initiation of the swage operation.

As noted, in the part, variable clamping has been accomplished by threaded fasteners by two or more steps of torque application. One problem has been in assuring that all such threaded fasteners have been finally set to the proper torque. To provide such assurance, literally all fasteners or a substantial representative number of such fasteners may have to be individually inspected via suitable torque indicating devices. With the present invention the fastener 10 is self flagging since the absence of the pin tail portion (after the pin break at the breakneck groove 40) provides an easy visual check that the fastener 10 has been set.

Figure 8:
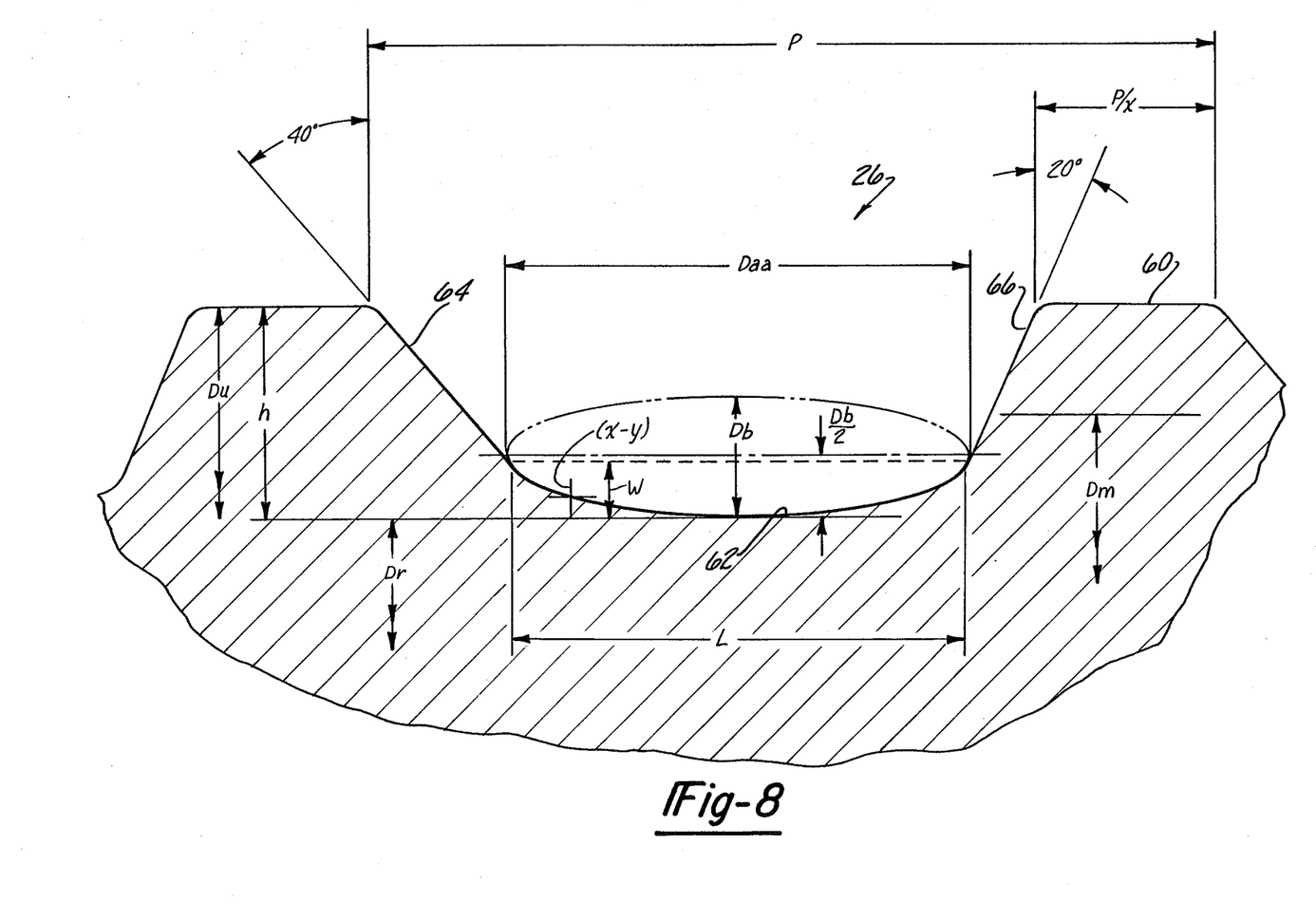
FIG. 8 is a fragmentary sectional view to enlarged scale of the shape of the helical lock groove of the pin of FIGS. 1 and 2.

As best can be seen in FIG. 8, in one form of the invention, the helical lock grooves 26 are of a shallow construction and have a closely approximated streamlined root configuration. A streamlined contour provides a transition between two different diameters with essentially no stress concentration or an effective stress concentration factor (Kt) of one (1). The helical lock grooves 26, which are separated by annular crests or shoulders 60 can be considered to be defined by a root portion 62, which is connected at one end to a leading transition portion 64 and at the opposite end to a trailing transition portion 66. In order to approximate a streamlined shape as closely as possible, the root portion 62 is generally elliptically shaped and can be generally defined by the relationship:

$$\frac{x^2}{Daa^2} + \frac{y^2}{Db^2} = 1,$$

where (x, y) are the coordinates for a point on the root curvature surface. Actually, the elliptical shape simulates two streamlined contours, one from transition portion 64 and the other from transition portion 66.

In addition to the above the lock grooves 26 are further defined by the following:
1. P is the pitch between successive helical lock grooves 26;
2. P/X is the width of the shoulders 60 where X is selected to provide proportioned strength between the ultimate shear strengths of the material of collar 14 and the material of pin 12 such that, under tensile load, a failure in shear could occur at the effective shear plane across either the pin shoulders 60 or the resultant shoulders in the swaged collar;

3. h is the depth of helical lock grooves 26;
4. Dr is the effective root diameter of helical lock grooves 26;
5. Du is the crest diameter of pin shoulders 60 (or the diameter defined by the crests of the threaded pin 12);
6. Daa is the major axis of the ellipse defining the elliptical root contour of root portion 62;
7. Db is the minor axis of the ellipse defining the elliptical root contour of root portion 62;
8. Db/2 is one half of the minor axis or the distance along the minor axis Db from root portion 62 up to the major axis Daa;
9. L is the axial distance between the respective tangential intercepts of the leading transition portion 64 and the trailing transition portion 66 with the ellipse portion defining root portion 62; and
10. W is the radial distance along the minor axis Db from root portion 62 to the axial line defined by the axial length L.

In one form of the invention, the leading transition portion 64 was provided to be at a 40° angle with a plane transverse to the axis of pin 12 while the trailing transition portion 66 was provided to be at a steeper angle of 20°. The angle of the leading portion 64 facilitates flow of the material of collar 14 in swage while the steeper angled trailing portion 66 provides a buttressing effect relative to the swaged collar material. This buttressing effect facilitates clamping of the workpiece 18 and 20 as the collar 14 elongates during swage. The transition portions 64 and 66 tangentially intercept the elliptical root portion 62 whereby a smooth transition in contour is provided. The elliptically shaped root portion 62 has an axial length L which is less than the major diameter Daa and a radial width W which is less than the minor axis dimension Db/2. the root portion 62 will always have a length L and width W no greater than the major and minor axis Daa and Db, respectively. However, in order to assure a smooth transition with the essentially straight transition portions 64 and 66, generally at the angles of inclination noted, it is desirable that the width W be no less than around 80% of the minor axis dimension Db/2 or 40% of Db.

With the fastener construction of FIGS. 1-2, it has been found that the depth of the grooves 26 can be selected to provide a desired minimum ratio of depth h to the crest diameter Du of the pin 12. The major criteria of groove depth h is that it be sufficiently deep as a practical matter to receive and retain the material of the collar 14 after swage. A groove depth h of around 0.04 ×Du or less is desirable, i.e. (h/Du)×10² = 4. With such a shallow groove, the root diameter Dr will be maximized for a pin with a given crest diameter Du. This will provide that a pin 12 of a given material will have nearly the maximum tensile strength available since tensile failure would generally occur across the root diameter Dr which, when maximized, is only slightly less than the crest diameter Du. The maximized root diameter Dr will also provide improved fatigue life. Actually since the grooves 26 are helical the tensile failure would occur across some mean diameter Dm between the root diameter Dr and crest diameter Du. Thus, for a pin of a given diameter, the present invention will result in an increase in tensile strength and fatigue life over its conventionally threaded counterpart. At the same time, the groove 26 being shallow will permit the use of the simulated streamlined or elliptical shape at root portion 62 resulting in a significantly reduced stress concentration factor Kt. Again, the result will be an increase in fatigue life over a comparable conventionally threaded fastener.

With a shallow groove construction, it is desirable to provide the collar 14 with a volume such that when swaged into the helical locking grooves 26 it will have an excess volume over that required to fill the grooves 26.

In one embodiment, the volume of collar 14 was selected to provide 'overpacking', i.e., a volume of collar 14 to provide substantially more volume of collar material for filling grooves 26 than they could normally accept within the swage envelope defined by the throat 36 (FIG. 1) of the swage cavity of anvil 56 and the confronting portion of pin 12. In the present system, it has been found desirable to provide a volume of collar material which has an excess of at least around 16%. With the shallow helical grooves 26, excess collar volume over the noted 16% is not required since the amount of radial inward movement of collar material is not as great as with prior lock grooves of a deeper construction. The percentage 'overfill' or 'overpacking' noted can be generally determined for a finite length of the effective swage portion of throat 36 by the relationship (see FIG. 1):

$$100 \times \frac{[(Dc^2 - ID^2) - (Da^2 - Dm^2)]dl}{[Da^2 - Dm^2]dl\,4} = \% \text{ overfill}$$

where:
Da is the diameter of the throat 36 of anvil 56;
Dc is the outside diameter of the collar 14 before swage;
ID is the inside diameter of the collar 14 before swage;
Dm is the mean diameter of the lock grooves 26; and
dl is considered to be a finite length within the swage portion of throat 36.

Because of the shallowness of the lock grooves 26, it is desirable that the pine 12 be hard enough relative to the hardness of the collar 14 to resist crushing or substantial yielding in tension or necking down from the high compressive swage loads. Thus, in one form of the invention, the pin 12 could be made of AISI 4140 alloy steel or AISI 1541 carbon steel having an ultimate shear strength of at least around 95 KSI. The collar 14 could be made of AISI 1035 carbon steel having an ultimate shear strength of at least around 45 KSI. Generally it is desirable to utilize a pin 12 having an ultimate shear strength relative to that of collar 14 in the ratio in a range of around 1.8:1 to around 2.4:1. Thus the pin 12 has a sufficient hardness to accept both the high tensile preloads desired and the swage loads on the collar 14 substantially without yielding. It also should be noted that, from a manufacturing standpoint, the shallow grooves 26 are more easily formed than the prior, deeper lock grooves and, in fact, can be formed after the pin 12 has been hardened.

However, in order to realize the high clamp load, the collar 14 must have a sufficient wall thickness and, hence, volume to insure that enough collar material will move axially in elongation. At the same time it is desirable that the swaged collar have sufficient wall thickness and, hence, have sufficient strength to resist any significant spring back from the shallow lock grooves 26. The collar wall also should have sufficient thickness to resist significant radial expansion under tensile load such that the pin shoulders 60 and collar shoulders remain in substantially full engagement as the design tensile load on the joint is reached. If the collar wall does not provide sufficient radial stiffness, the collar 14 could expand radially under tensile load, reducing the effective shear plane carrying the load. The result could be a premature failure in shear at the tips of the pin shoulders 60 or collar shoulders.

Thus, the collar wall thickness is selected to provide the necessary material to promote swaging into the shallow helical lock grooves 26 and flow in elongation to provide the desired clamp load. At the same time, the collar wall thickness at final swage is also selected to provide sufficient, radial stiffness or hoop strength to resist significant radial spring back from the grooves 26 both during initial swage and also under subsequent tensile loading. Also, the volume of the collar 14 and swage cavity 36 are selected to provide movement of the material of collar 14 into the grooves 26 to assure a good fill. With the above dimensions and an anvil throat portion to provide approximately 16% overfill, satisfactory results were obtained. In this regard an overfill significantly under 16% would not provide the desired high preloads while an overfill significantly over 16% could result in excessive installation loads which could yield the pin 12. For a pin 12 and collar 14 of the ferrous materials having the relative shear strengths previously noted, the following dimensional relationships (in inches) were found satisfactory:

| NOM DIA. | Pin Crest Diameter Du | Depth of Grooves h | Collar O.D. Before Swage Dc | Collar I.D. Before Swage ID | Anvil Throat Diameter Da | Pin Mean Lock Groove Diameter Dm |
|---|---|---|---|---|---|---|
| ½ | .500 | .0155 | .810 | .522 | .753 | .486 |
| ⅝ | .625 | .0200 | 1.009 | .648 | .939 | .605 |
| ¾ | .750 | .0245 | 1.213 | .783 | 1.125 | .725 |

It is also desirable, that the width of the pin grooves 26 and pin shoulders 60 and the complementary grooves and shoulders of the swaged collar 14 be proportioned in width relative to the respective shear strengths of the materials of pin 12 and collar 14 such that both the shoulders defined by pin grooves 26 of the pin 12 and the shoulders defined by interlocking grooves of the swaged collar 14 are in incipient or simultaneous failure in shear at or above the preselected minimum ultimate design tensile load on workpieces 18 and 20. It is preferred that the design provide for the shoulders defined by the grooves of collar 14 to fail prior to the shoulders defined by pin lock grooves 26, i.e. the shoulders of pin 12 would fail in shear at approximately 110% of the tensile load at which the shoulders of collar 14 would fail. By proportioning the grooves as noted, the engaged length of pin and collar can be minimized for a given tensile load. Of course, by providing sufficient collar length, the above shear strength relationship can be maintained while providing for a tensile failure diametrically across the pin lock groove portion 25.

The application of proportioned strength permits the pin grooves 26 to be elongated relative to the shoulders 60 whereby the use of an approximated, streamlined root shape can be more effectively employed. At the same time the shallow groove structure permits smooth transitions between the root 62 and the connecting sidewalls 64 and 66. While the elliptical contour employed will closely approximate the desired streamlined shape other similar continuous curves could be utilized.

Another advantage of employing proportioned strength as noted is that the shear strength of the limited collar thread 63 can now be maximized permitting the pre-fastened clamp via torquing to be at a relatively high magnitude and/or permitting the fastener 10 in its pre-fastened clamp condition to withstand the necessary loads to hold the structure together during the fit up operation. This is achieved by virtue of the fact that the width of collar thread 63 is substantially the same as the width of the groove of thread 26. By permitting the construction of a thread of such maximum strength, a single 360° thread can be adequate for many applications; this facilitates construction of the collar thread 63 by cold forming obviating the need to form additional threads which could require a separate machine operation.

With the fastener 10 constructed as described, for ferrous materials, the retained preload on the workpieces 18 and 20 after installation will be preferably between around 85% to around 95% of the applied installation load and the applied installation load, as noted, will be approximately at the yield point of pin 12. The installation load is the maximum load applied to the fastener in setting the fastener through pin break at breakneck groove 40. Note that, for ferrous materials, the yield point of pin 12 will be approximately 80% of the minimum design ultimate load of the fastened joint.

With the fastener 10 installed, the swaged collar 14 will have a complementary female thread formed in its bore 61. This will now permit the fastener 10 to be removed by torquing off the collar 14 via suitable tools applied to the wrenching surfaces on the pin head 22 and the collar flange 59. At the same time the collar 14 could, in some circumstances have additional torque applied.

Figure 3:
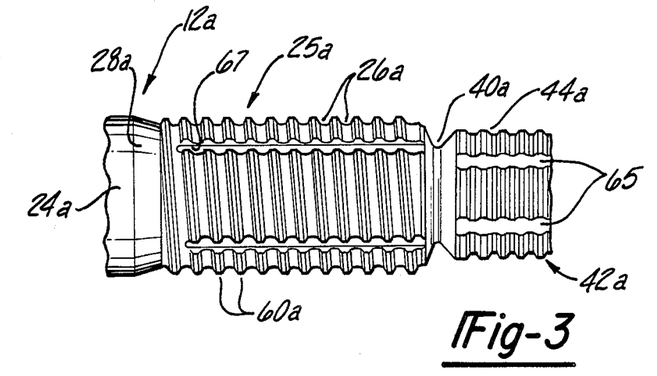
FIG. 3 is a fragmentary view of a pin similar to that of FIG. 1 showing a different form of lock section.

In some constructions, it may be desirable to provide that the swaged collar such as collar 14 not loosen from vibration, etc. This can be effectively precluded by the addition of antirotation grooves in the pin as shown in FIG. 3. Thus in the embodiment of FIG. 3, the pin 12a has a plurality of axially extending grooves 67 in the threaded lock groove portion 25a such that when the collar (such as collar 14) is swaged thereon, collar material will flow into the axial grooves 67 precluding relative rotation between the pin 12a and associated swaged collar. The remainder of pin 12a is similar to pin 12 and hence similar portions have been given the same numeral designation with the addition of the letter postscript "a".

Figure 4:
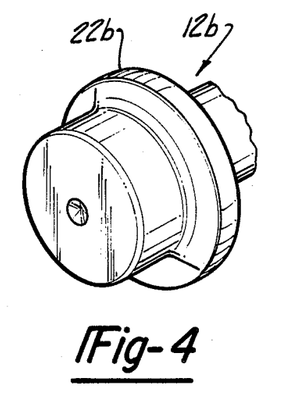
FIG. 4 is fragmentary pictorial view of a pin head similar to that of the pin of FIG. 1 but having a smooth exterior.
Figure 5:
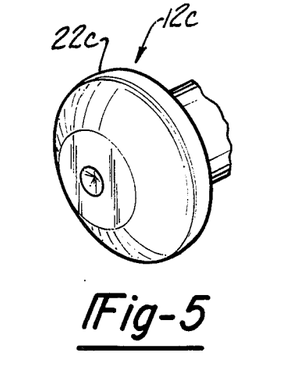
FIG. 5 is a fragmentary pictorial view of a pin head having a brazier head style with a smooth exterior.

In some applications it may be desirable to inhibit removal of the swaged collar. Thus FIGS. 4 and 5 show two exemplary styles of pin heads 22b and 22c for pins 12b and 12c, respectively. The pin head 22b of FIG. 4 is similar to that of pin head 22 of FIGS. 1 and 2 except that the wrenching flats have been removed whereby a smooth outer contour is provided. The pin head 22c of FIG. 5 is a conventional brazier type head having a smooth outer contour absent any wrenching flats. In all other respects the pins 12b and 12c are the same as the pin 12 of FIGS. 1 and 2.

Figure 7:
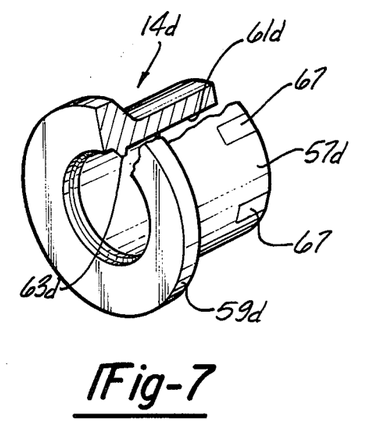
FIG. 7 is a partially, broken pictorial view of a collar similar to that of FIGS. 1, 2 and 6 but having a smooth exterior contour.

In FIG. 7 a collar 14d is shown which is similar to collar 14 of FIGS. 1 and 2 except that the collar flange 59d is smooth and absent any wrenching flats. Other portions of collar 14d similar to portions of collar 14 have been given the same numeral designation with the addition of the letter postscript "d".

A fastener utilizing a combination of the smooth head styles of pin heads 22b and 22c, the smooth flanged collar of 14d and the antirotation pin 12a will provide an effective combination for inhibiting removal. However, to facilitate installation of the smooth collar 14d onto the threaded lock groove portion 26a where a smooth style pin head 22b or 22c is utilized a plurality of flats 65 can be provided on the pull groove portion 42a of pin 12a and flats 67 can be provided on the shank 57d of collar 14d such that the pin 12a and collar 14d can be gripped by a suitable tool to facilitate threading the assembly together. Upon completion of the swaging operation, the collar flats 67 will have been reformed to a final smooth annular swaged contour and the pull portion 42a with flats 65 will have been removed via fracture at the breakneck 40a; thus the remaining portions of the set fastener will have a configuration which is absent flats or other convenient gripping surfaces whereby removal of the swaged fastener will have been inhibited.

the fastener 10 shown and discussed above is a pull type fastener adapted to be finally installed by a conventional pull type tool 48. The features of the invention, however, are also applicable to a stump type fastener adapted to be finally installed by a squeeze type tool. Thus a stump type fastener is shown in FIGS. 9 and 10 in which components similar to like components in the embodiment of FIGS. 1 and 2 have been given the same numeral designation with the addition of the letter postscript "e".

Figure 9:
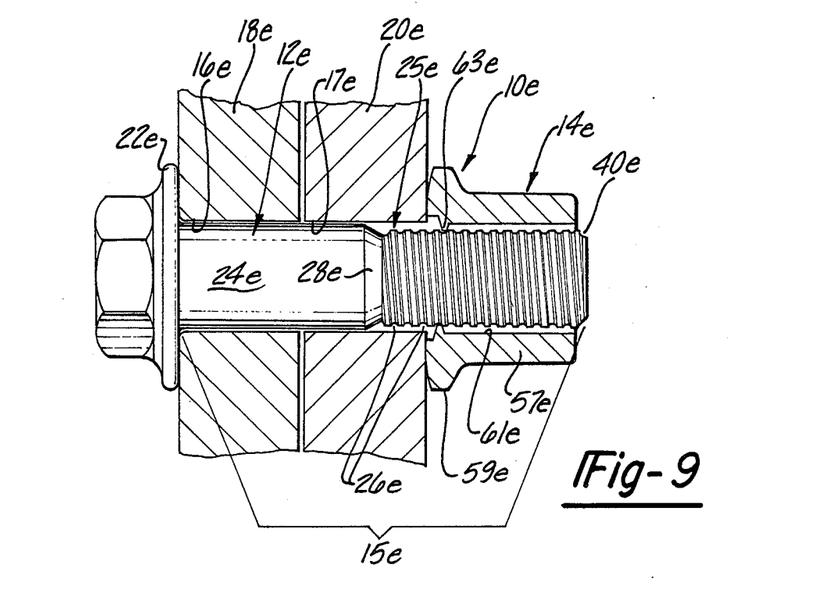
FIG. 9 is a view similar to that of FIG. 1 depicting a stump version of the fastener of FIG. 1.
Figure 10:
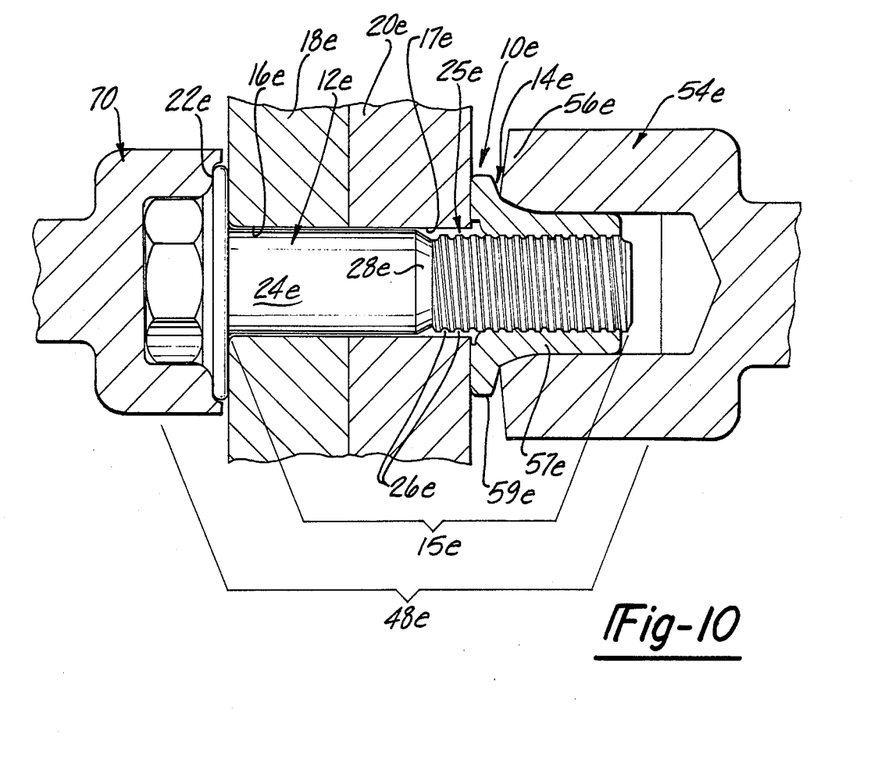
FIG. 10 is a view similar to that of FIG. 9 showing the stump version of FIG. 9 after it has been set by a squeeze tool.

Looking now to FIGS. 9 and 10, a stump type fastener 10e is shown to include a pin member 12e and tubular collar 14e. Pin member 12e has an elongated shank 15e which extends through aligned openings 16e and 17e in a pair of workpieces 18e and 20e, respectively, to be secured together. An enlarged protruding head 22e at one end of shank 15e engages one side of workpiece 18e. Adjacent the head 22e, the shank 15e has a straight portion 24e which is adapted to be received within aligned bores 16e and 17e with a clearance fit. Following the straight portion 24e is a lock groove portion 25e defined by a plurality of grooves 26e having a continuous, helical thread form. A transition portion 28e smoothly connects the locking grooves 26e with straight shank portion 24e.

The tubular collar 14e has a generally straight shank portion 57e terminating in an enlarged flange 59e. Both the pin head 22e and collar flange 59e have wrenching flats to facilitate gripping by a wrench or other suitable tool for applying a relative torque between the pin member 12e and collar 14e. The collar 14e has a limited, female thread 63e formed at the flange end of the bore 61e for threadably engaging the helical lock grooves 26e. The thread 63e is limited and in one form is defined by around a single, 360° thread.

In operation, the workpieces 18e and 20e can be first joined together by the threaded engagement between the limited collar thread 63e and the threaded lock grooves 26e. The wrenching surfaces on the pin head 22e and collar flange 59e facilitate torquing to the desired magnitude or extent of clamp. Next a squeeze type installation tool 48e is applied to the fastener 10e and a relative axial force is applied between the pin 12e and collar 14e via a swage anvil 56e engaging the outer end of the collar 14e and a reaction member 70 adapted to engage the pin head 22e. As the relative axial force increases the limited collar thread 63e will shear or deform sufficiently to permit the collar 14e to move further axially relative to the pin 12e. In this condition the pin 12e and collar 14e will now act as a swage type fastener; the workpieces 18e and 20e are clamped together at a preselected preload by the relative axial force initially applied between the pin 12e and collar 14e and, as the axial force increases, the collar 14e is swaged into the helical lock groove portion 25e completing the swaging operation (see FIG. 10).

Note that the contour of the swage cavity of the swage anvil 56e and the contour of the outer end of the collar 14e are such that swaging of the collar 14e into the lock grooves 26e will not start to occur at the lower magnitude of relative axial force required to shear or deform the limited collar thread 63e at the initiation of the swage operation.

The tool 48e can be of a construction of a known type in which the swage anvil 56e and reaction member 70 are located in a generally "C" shaped housing with the anvil 56e and reaction member 70 being moved towards each other when the tool 48e is actuated to apply a relative axial force to squeeze the fastener located in between.

Thus features of the present invention can be utilized with a stump type fastener as well as with a pull type.

Thus a unique fastener has been provided permitting a variation in clamp load on the workpieces being connected while still permitting a high final clamp via a swaged connection between the pin and collar. In one form of the invention, the pin can be provided with shallow helical grooves whereby a high strength construction can be achieved having a desirable high clamp load while at the same time maintaining the integrity of the thread form of the lock groove portion of the pin whereby torque can be applied for additional clamp up or collar removal.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a fastening system including a fastener for securing workpieces together with a selectively variable clamp with said fastener adapted to be finally installed via a relative axial force applied by a pull tool, said fastener comprising:

a pin member having an elongated shank terminating at one end in an enlarged pin head, said shank including a pull portion located at the opposite end from said pin head, a straight smooth shank portion located adjacent said enlarged pin head, a plurality of helically extending lock grooves defining a thread form located adjacent said straight shank portion, a breakneck groove defining the weakest portion of said pin shank and located between said pull portion and said lock grooves, a tubular collar adapted to be located on said pin shank and to be swaged into said lock grooves in response to a first preselected magnitude of said relative axial force applicable by the pull tool, said collar having a through bore of a diameter to generally receive said pull portion and said lock grooves in clearance relationship, said collar having a limited female thread formed on said through bore and adapted to threadably engage said thread form defined by said lock grooves, said collar and said pin member having first and second wrenching surfaces adapted to be gripped by a wrenching tool whereby said collar can be torqued onto said lock groove portion to selectively clamp or locate the workpieces relative to each other more or less under a selectively variable torque whereby the workpieces can be selectively adjusted or aligned, said limited collar thread having a preselected strength selected to deform out of said lock grooves in response to a second preselected magnitude of said relative axial force applied between said pin member and said collar by the pull tool with said second preselected magnitude being less than said first preselected magnitude whereby said collar can be moved axially over said pin member after deformation of said limited collar thread and prior to initiation of swaging of said collar into said lock grooves.

2. The fastening system of claim 1 with said collar having a flange at one end adapted to engage the confronting surface of one of the workpieces and with said limited collar thread formed generally in radial alignment with said collar flange.

3. The fastening system of claim 1 with said limited collar thread extending circumferentially for no more than around 360°.

4. The fastening system of claim 1 with said lock grooves being defined by pin groove portions and pin shoulder portions, said collar after swage having collar groove portions and shoulder portions formed in said collar bore which are complementary to said lock grooves, the axial widths of said pin groove portions and shoulder portions, and said collar groove portions and shoulder portions being preselected in accordance with the relative shear strength of the materials of said pin member and said collar whereby said pin shoulder portions and said collar shoulder portions are adapted to fail in shear generally at the same tensile load applied between said pin member and said collar.

5. The fastening system of claim 4 with said limited collar thread being defined by a limited shoulder portion with the axial width of said limited shoulder portion being substantially the same as the axial width of said pin groove portions.

6. The fastening system of claim 5 with said limited collar thread extending circumferentially for no more than around 360°.

7. In a fastening system including a fastener for securing workpieces together with a selectively variable clamp with said fastener adapted to be finally installed via a relative axial force applied by an installation tool, said fastener comprising:

a pin member having an elongated shank terminating at one end in an enlarged pin head, a lock groove portion on said shank including a plurality of helically extending lock grooves defining a thread form, a tubular collar adapted to be located on said pin shank and to be swaged into said lock grooves in response to a first preselected magnitude of said relative axial force applicable by the installation tool, said collar having a through bore of a diameter to generally receive said lock grooves in clearance relationship, said collar having a limited female thread formed on said through bore and adapted to threadably engage said thread form defined by said lock grooves, whereby said collar can be torqued onto said lock groove portion to selectively clamp or locate the workpieces relative to each other more or less under a selectively variable torque whereby the workpieces can be selectively adjusted or aligned, said limited collar thread having a preselected strength selected to deform out of said lock grooves in response to a second preselected magnitude of said relative axial force applied between said pin member and said collar by the installation tool with said second preselected magnitude being less than said first preselected magnitude whereby said collar can be moved axially over said pin member after deformation of said limited collar thread and prior to initiation of swaging of said collar into said lock grooves.

8. The fastening system of claim 7 with said collar having a flange at one end adapted to engage the confronting surface of one of the workpieces and with said limited collar thread formed generally in radial alignment with said collar flange.

9. The fastening system of claim 7 with said limited collar thread extending circumferentially for no more than around 360°.

10. The fastening system of claim 7 with said lock grooves being defined by pin groove portions and pin shoulder portions, said collar after swage having collar groove portions and shoulder portions formed in said collar bore which are complementary to said lock grooves, the axial widths of said pin groove portions and shoulder portions, and said collar groove portions and shoulder portions being preselected in accordance with the relative shear strength of the materials of said pin member and said collar whereby said pin shoulder portions and said collar shoulder portions are adapted to fail in shear generally at the same tensile load applied between said pin member and said collar.

11. The fastening system of claim 10 with said limited collar thread being defined by a limited shoulder portion with the axial width of said limited shoulder portion being substantially the same as the axial width of said pin groove portions.

12. The fastening system of claim 11 with said limited collar thread extending circumferentially for no more than around 360°.

13. In a fastening system including a fastener for securing workpieces together with a selectively variable clamp with said fastener adapted to be finally installed via a relative axial force applied by an installation tool, said fastener comprising:

a pin member having an elongated shank terminating at one end in an enlarged pin head, a lock groove portion on said shank including a plurality of helically extending lock grooves defining a thread form, a tubular collar adapted to be located on said pin shank and to be swaged into said lock grooves in response to a first preselected magnitude of said relative axial force applicable by the installation tool, said collar having a through bore of a diameter to generally receive said lock grooves in clearance relationship, said collar having a limited female thread formed on said through bore and adapted to threadably engage said thread form defined by said lock grooves, wrenching means comprising a plurality of discontinuities on said collar and said pin member for facilitating torquing of said collar onto said lock groove portion to selectively clamp or locate the workpieces relative to each other more or less under a selectively variable torque whereby the workpiece can be selectively adjusted or aligned, said limited collar thread having a preselected strength selected to deform out of said lock grooves in response to a second preselected magnitude of said relative axial force applied between said pin member and said collar by the installation tool with said second preselected magnitude being less than said first preselected magnitude whereby said collar can be moved axially over said pin member after deformation of said limited collar thread and prior to initiation of swaging of said collar into said lock grooves.

14. The fastening system of claim 13 with said plurality of discontinuities of said wrenching means on at least one of said collar and said pin member adapted to be removed in response to said collar being swaged onto said pin member.

15. The fastening system of claim 13 with said pin shank having a pull portion located at the end opposite from said pin head, a breakneck groove defining the weakest portion of said pin shank and located between said pull portion and said lock grooves and adapted to fracture at a relative axial force greater than said first preselected magnitude, said plurality of discontinuities of said wrenching means being on the exterior of said collar and adapted to be removed in response to said collar being swaged and said plurality of discontinuities of said wrenching means being on said pull portion which is removed upon fracture at said breakneck groove.

* * * * *

UNITED STATES PATENT AND TRADEMARK OFFICE
CERTIFICATE OF CORRECTION

PATENT NO. : 4,867,625
DATED : September 19, 1989
INVENTOR(S) : Richard D. Dixon It is certified that error appears in the above-identified patent and that said Letters Patent is hereby corrected as shown below:

Column 1, line 9, "files" should read "filed".
Column 1, line 56, "fasteners" should read "fastener".
Column 2, line 59, "supported" should read "supporting".
Column 3, line 65, "grove" should read "groove".

Column 6, line 26, "part" should read "past".
Column 7, line 33, "workpiece" should read "workpieces".
Column 7, line 40, "the" should read "The".
Column 8, line 45, "pine" should read "pin".
Column 11, line 34, "the" should read "The".

Signed and Sealed this

Twenty-second Day of January, 1991

*Attest:*

HARRY F. MANBECK, JR.

*Attesting Officer*      *Commissioner of Patents and Trademarks*